United States Patent
Endo et al.

[11] Patent Number: 5,867,345
[45] Date of Patent: Feb. 2, 1999

[54] EJECTING DEVICE FOR IMAGE PICK UP APPARATUS

[75] Inventors: Hidetoshi Endo; Hiroaki Fukuda; Tetsuharu Tokeshi, all of Ikegami, Japan

[73] Assignee: Ikegami Tsushinki Co., Ltd., Tokyo, Japan

[21] Appl. No.: 715,369

[22] Filed: Sep. 12, 1996

[30] Foreign Application Priority Data

Apr. 12, 1996 [JP] Japan ................................. 8-091607

[51] Int. Cl.⁶ .................................................. G11B 17/04
[52] U.S. Cl. ........................................................ 360/99.06
[58] Field of Search ........................... 360/99.06, 99.08, 360/96.06, 96.05

[56] References Cited

U.S. PATENT DOCUMENTS

| | | | |
|---|---|---|---|
| 4,649,453 | 3/1987 | Iwasawa | 360/96.06 |
| 4,706,141 | 11/1987 | Oba et al. | 360/96.06 |
| 5,359,478 | 10/1994 | Kawano | 360/99.06 |
| 5,450,259 | 9/1995 | Cho et al. | 360/96.06 |
| 5,469,271 | 11/1995 | Hoshino et al. | 358/335 |
| 5,563,673 | 10/1996 | Aoshima | 396/516 |
| 5,598,305 | 1/1997 | Nakanishi et al. | 360/96.06 |
| 5,657,081 | 8/1997 | Kurahashi | 360/99.06 |

FOREIGN PATENT DOCUMENTS

| | | |
|---|---|---|
| A2-661-586 | 7/1995 | European Pat. Off. . |
| A-62-172560 | 7/1987 | Japan . |
| A-01-124152 | 5/1989 | Japan . |
| A-5-158140 | 6/1993 | Japan . |

*Primary Examiner*—Allen T. Cao
*Attorney, Agent, or Firm*—Oliff & Berridge, PLC

[57] ABSTRACT

A pivot of a movable holding member holding a disk pack is provided at inner side of a pivot of a cover member to be selectively opened and closed relative to an opening end portion of a disk pack receptacle portion. Then, the movable holding member and the cover member are connected to a link mechanism. Also, by a connection control mechanism portion, a connector of a disk pack is automatically controlled connection with a connector depending upon pivot of the movable holding member.

10 Claims, 16 Drawing Sheets

EJECTING DEVICE FOR IMAGE PICK UP APPARATUS

BACKGROUND OF THE INVENTION

1. Field of Invention

The present invention relates to an ejecting device for an image pick up apparatus, which performs an operation for receiving a portable recording medium unit within a recording medium receptacle portion in the image pick up apparatus and an operation for removing the portable recording medium received in the recording medium receptacle portion.

2. Description of Related Art

A typical image pick up apparatus includes a video cassette which has a magnetic tape as a recording medium for recording an image signal obtained through an image pick up portion and for recording an audio signal obtained through a microphone. The magnetic tape is wound around a reel. Among a variety of image pick up apparatuses, there are some image pick up apparatuses in which recording medium receptacle portions are provided. In the recording medium receptacle portion is an ejecting device for appropriately positioning the video cassette relative to a recording head for recording the image signal on the magnetic tape of the video cassette and for ejecting the video cassette received within the recording medium receptacle portion. In the image pick up apparatus called as a business use television video camera, there has been proposed a portable recording medium unit called as a disk pack in which a magnetic disk is used as the recording medium in place of the video cassette, a recording and reproducing head portion for recording the image signal as an image pick up data and reproducing the recorded image pick up data, and a control portion for controlling rotational driving of the magnetic disk, all housed within a protective cover. At the lower end of the protective cover of the disk is a first input/output terminal portion for inputting the image pick up data from a signal processing circuit portion in the image pick up apparatus to be recorded on the magnetic disk, responsive to an external control signal, for outputting an image pick up data reproduced from the magnetic disk. On the other end, in the recording medium receptacle portion, there is provided a second input/out terminal portion located in opposition to the first input/output terminal and connected to the latter.

Upon loading the disk pack into or removing the disk pack from the recording medium receptacle portion of the image pick up device, it becomes necessary to mechanically connect and disconnect the first input/output terminals of the disk pack relative to the second input/output terminal. Since the weight of the disk pack is large in comparison with the video cassette, and due to the large number of pins in the input/output terminals, relatively large force may be required for connecting and disconnecting the terminals. Also, since the disk pack is arranged within the recording medium receptacle position at a distance from an opening portion for inserting and removing the disk pack, when the disk pack is removed from the upper end side while tilted at a relatively large angle, the image pick up apparatus may be dropped due to the heavy weight of the disk pack in comparison 15 with the video cassette.

Thus, in case that a disk pack is employed, the ejecting device can have complicated mechanism and/or be bulky in comparison with the case where the video cassette is employed. As a result, an area to be occupied by the recording medium receptacle portion becomes relatively large so as to cause difficulty in down-sizing of the image pick up apparatus.

SUMMARY OF THE INVENTION

In view of the problems set forth above, it is an object of the present invention to provide an ejecting device for an image pick up device for performing an operation for receiving a portable recording medium unit within a recording medium receptacle portion in the image pick up apparatus and an operation for removing the portable recording medium received in the recording medium receptacle portion, wherein down-sizing is facilitated with simple construction and connection and disconnection of input/output terminals can be assured.

In order to accomplish the above-mentioned object and other objects, an ejecting device of an image pick up apparatus, according to the present invention, includes:

a portable recording medium unit arranged within a recording medium receptacle portion in said image pick up apparatus and having a recording medium and a first input/output terminal portion performing inputting and outputting an image pick up data relative to said recording medium;

a cover member pivotably attached to a first support portion in a stationary member provided within said recording medium receptacle portion, and selectively positionable between an open and closed condition relative to an opening portion of said recording medium receptacle portion;

a movable holding member having an opening portion at a position opposed to said first input/output terminal portion in said portable recording medium unit, connected to and pivotably supported on a second support portion provided inside the first support portion of said stationary member, holding said portable recording medium unit for operating to shift at an eject position and at a stored position;

a connection control mechanism portion having a second input/output terminal portion to be connected to said first input/output terminal portion via an opening portion of said movable holding member, connected to said movable holding member and for connecting and disconnecting of said second input/output terminal portion relative to said first input/output terminal portion depending upon operation of said movable holding member;

a link member connecting said cover member and said movable holding member; and opening and closing driving means for placing said cover member between open and close conditions.

The ejecting device for an image pick up apparatus may further comprise a pushing member provided on said cover member and has a pushing surface portion contacting with the end surface of said portable recording medium unit when said portable recording medium unit is held and placed at the stored position by said movable holding member, for pushing said first input/output terminal portion relative to said second input/output terminal portion.

Furthermore, the connection control mechanism portion may include:

a supporting member arranged in said movable holding member and movably supporting a plate member having said second input/output portion arranged in opposition to said first input/output terminal portion;

an elastic member placing said plate member at a closely shifted condition relative to said first input/output terminal portion depending upon pivoting movement of said movable holding member; and a restricting member for placing said plate member away from said first input/output terminal portion depending upon pivoting movement of movable holding member arranged at said stationary member provided within said recording medium receptacle portion.

The cover member may have an extension portion covering the upper portion in said recording medium receptacle portion.

With the ejecting device for the image pick up apparatus according to the present invention, the cover member is pivotably supported on the first support portion in the stationary member provided within the recording medium receptacle portion. On the other hand, the movable holding member has the opening portion positioned in opposition to the first input/output terminal portion in the portable recording medium unit and is pivotably connected to the second support portion provided at inner side than the position where the first support portion of the stationary member is provided to perform operation for holding the portable recording medium unit and shifting to the ejecting position, or to perform operation for holding the portable recording medium unit and shifting to the storing position. Since the link member connects the cover member and the movable holding member, when the cover member is placed at open and closed conditions, the movable holding member can shift the portable recording medium unit to the ejecting position and register position via the link member depending upon pivoting movement of cover member.

On the other hand, since the second supporting portion of the movable holding member is provided at a position inside where the first supporting portion is positioned in the stationary member, the open degree of the cover member relative to the opening portion of the recording medium receptacle portion can be set greater than the open degree of the movable holding member relative to the opening portion of the recording medium receptacle portion. As a result, setting of the portable recording medium unit in the movable holding member or ejection of the portable recording medium unit from the movable holding member can be easily performed.

Furthermore, the connection control mechanism portion has the second input/output terminal portion to be connected to the first input/output terminal portion of the portable recording medium unit via the opening portion of the movable holding member, is connected to the movable holding member and performs connection and disconnection of the second input/output terminal portion relative to the first input/output terminal portion depending upon the operation of the movable holding member. Therefore, according to opening and closing condition of the cover member and in association with the operation of the movable holding member, the first input/output terminal portion is automatically connected and disconnected to and from the second input/output terminal portion. When a pushing member pushes the first input/output terminal portion relative to the second input/output terminal, connection can be more assured.

Accordingly, the ejection device can be simple in construction and downsizing becomes easy. Also, connection and disconnection of the input/output terminal can be performed certainly.

BRIEF DESCRIPTION OF THE DRAWINGS

The present invention will be understood more fully from the detailed description given herebelow and from the accompanying drawings of preferred embodiments of the invention, which, however, should not be taken to be limitative to the present invention, but are for explanation and understanding only.

In the drawings.

DETAILED DESCRIPTION OF PREFERRED EMBODIMENTS

The present invention will be discussed hereinafter in detail in terms of the preferred embodiment of the invention with reference to the accompanying drawings. In the following description, numerous specific details are set forth in order to provide a thorough understanding of the present invention. The present invention may be practiced without these specific details. In some instances, well-known structures are not shown in detail in order to avoid unnecessarily obscuring the present invention.

Figure 2:
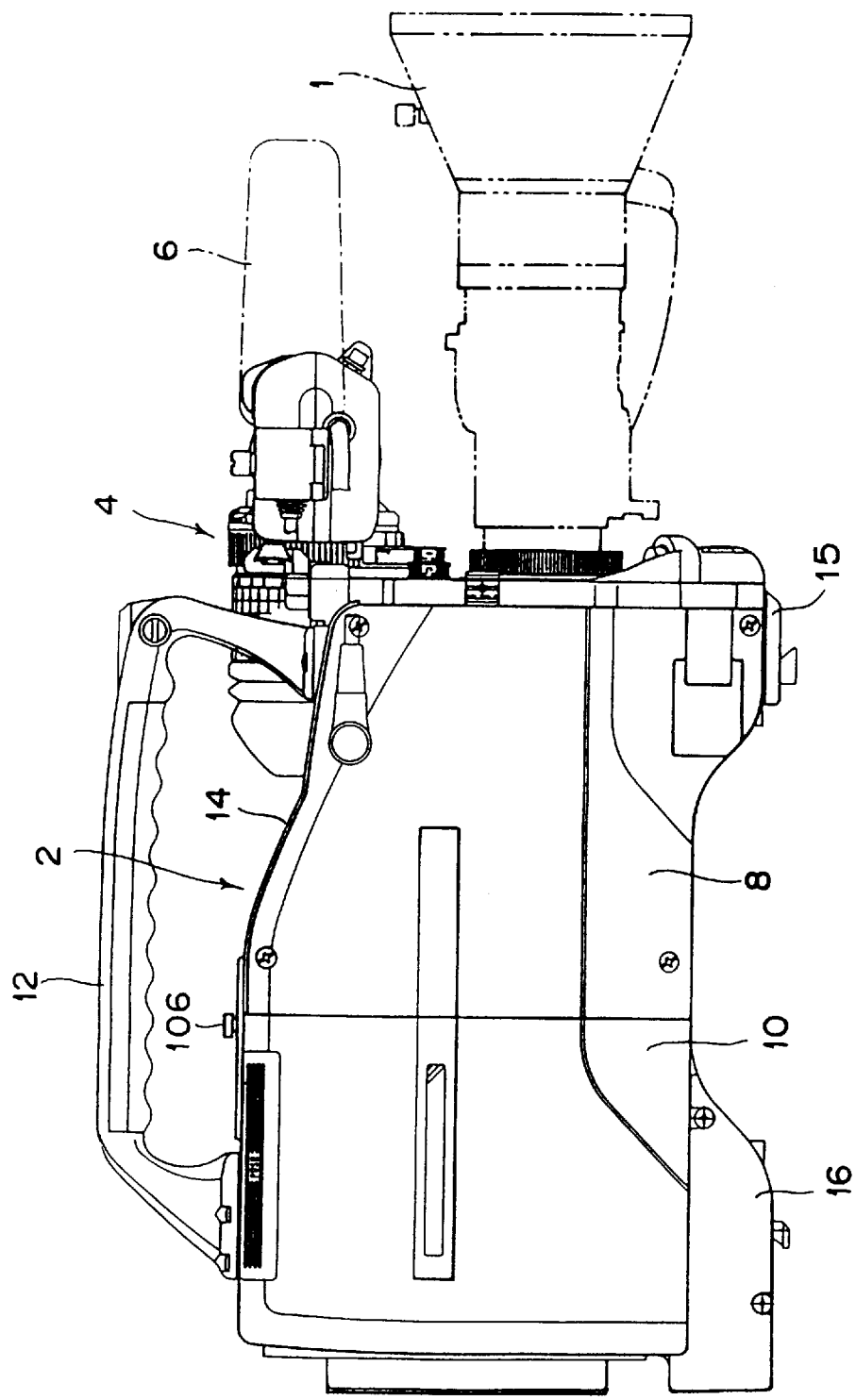
FIG. 2 is an external view of the image pick up apparatus, in which one embodiment of the ejecting device for the image pick up apparatus according to the present invention is applied.
Figure 3:
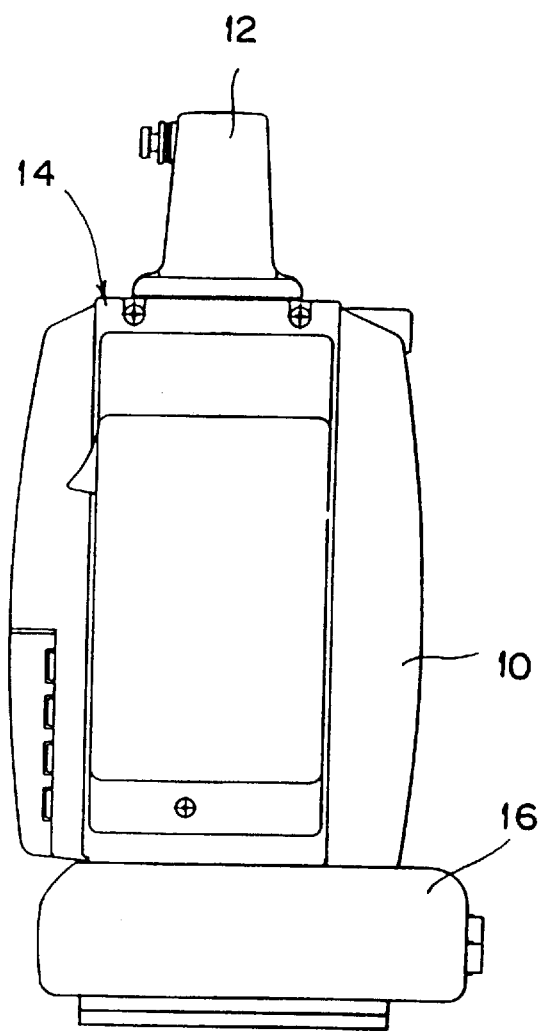
FIG. 3 is a side elevation of the embodiment shown in FIG. 2.

FIGS. 2 and 3 show an image pick up apparatus, to which one embodiment of an ejecting device for the image pick up apparatus according to the present invention is directed.

The image pick up apparatus, shown in FIGS. 2 and 3, includes an optical portion 1 having an image pick up lens for forming an optical image of an object on an image pick up surface, a main body portion 2 having a solid state image pick up element converting the optical image formed on the image pick up surface into an electrical signal, a signal processing circuit portion performing predetermined signal processing on the basis of the electrical signal obtained through photoelectric conversion by the solid state image pick up element, a control portion controlling recording of an image signal from the signal processing circuit portion and a reproducing operation, a disk pack receptacle portion as a recording medium receptacle portion for receiving a disk pack, for example, as a portable recording medium unit, a view finder portion 4, and a microphone portion 6.

The main body portion 2 has a construction in which the signal processing circuit portion and the control portion and so forth are housed within a casing 14 having a handle 12 at the upper portion thereof. The main body portion 2 includes an image signal forming portion 8, in which the signal processing circuit portion, the control portion and so forth are housed, a disk pack receptacle portion 10 for receiving the disk pack for recording an image pick up data from the image signal forming portion 8 or reproducing the image pick up data recorded in the recording medium, a front leg portion 15 and a rear leg portion 16 provided at the front and rear portions, respectively, of the lower end of the casing 14.

Figure 7:
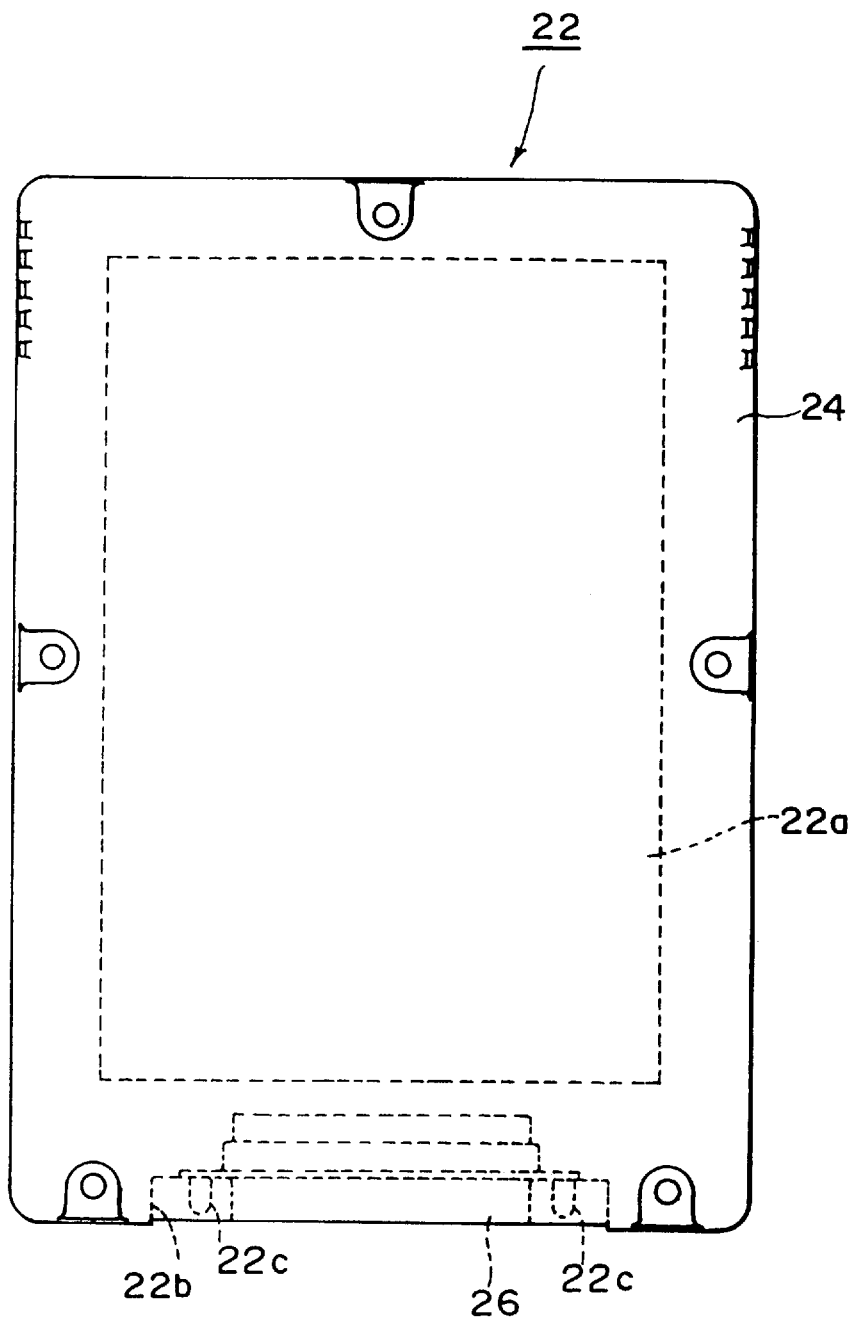
FIG. 7 is an external view of a disk pack to be employed in one embodiment of the ejecting device for the image pick up apparatus according to the invention.
Figure 8:
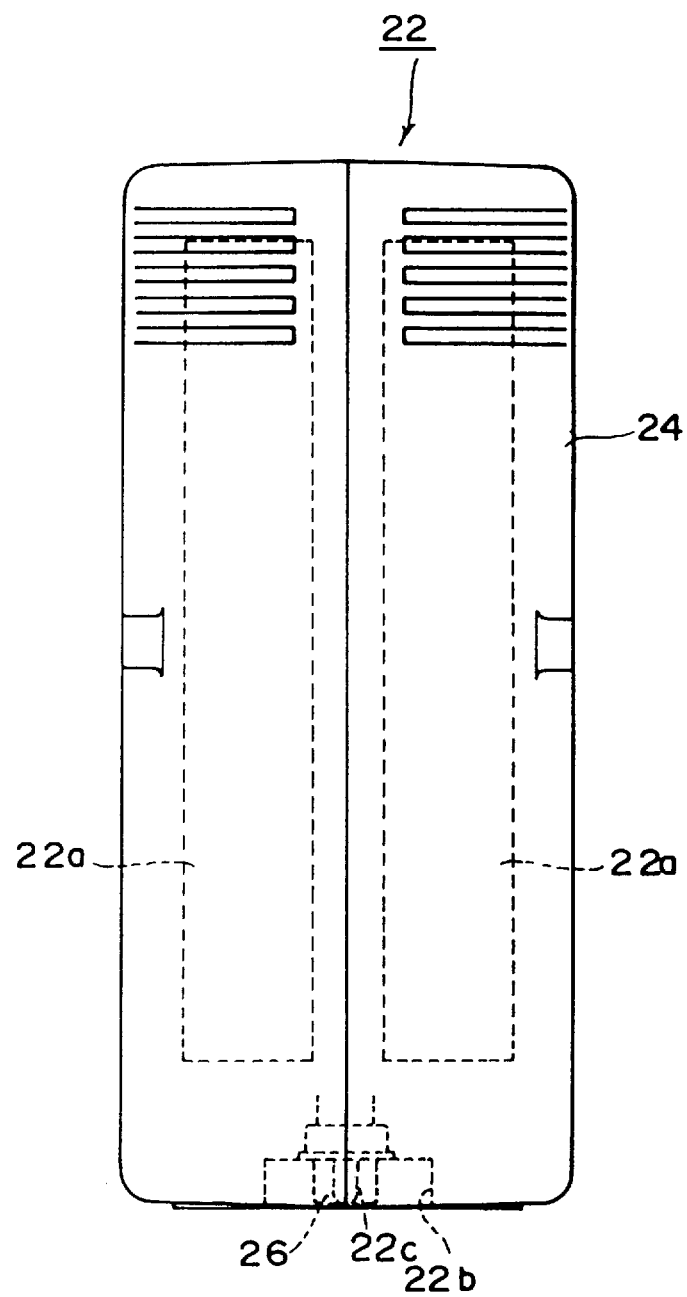
FIG. 8 is a side elevation of the disk pack shown in FIG. 7.

As shown in FIGS. 7 and 8, the disk pack 22 received within the disk pack receptacle portion 10 has a protective casing 24, in which a magnetic disk drive unit 22a including a plurality of magnetic disks (hard disk) is housed. The magnetic disk drive unit 22a has a recording and reproducing head arranged in opposition to a recording surface of respective magnetic disks, and a driving portion for driving the magnetic disk unit 22a. At the lower end of the protective casing 24, a recessed portion 22b is formed. In the recessed portion 22b, a male connector 26 acts as a first input/output terminal portion for performing input and output of the image pick up data and the control signal is fixed. Adjacent to the connector 26, a pair of male pins 22c for positioning are provided in parallel in a mutually spaced apart relationship with a given distance. It should be noted that, for positioning, holes may be provided in place of the positioning pins 22c.

Figure 1:
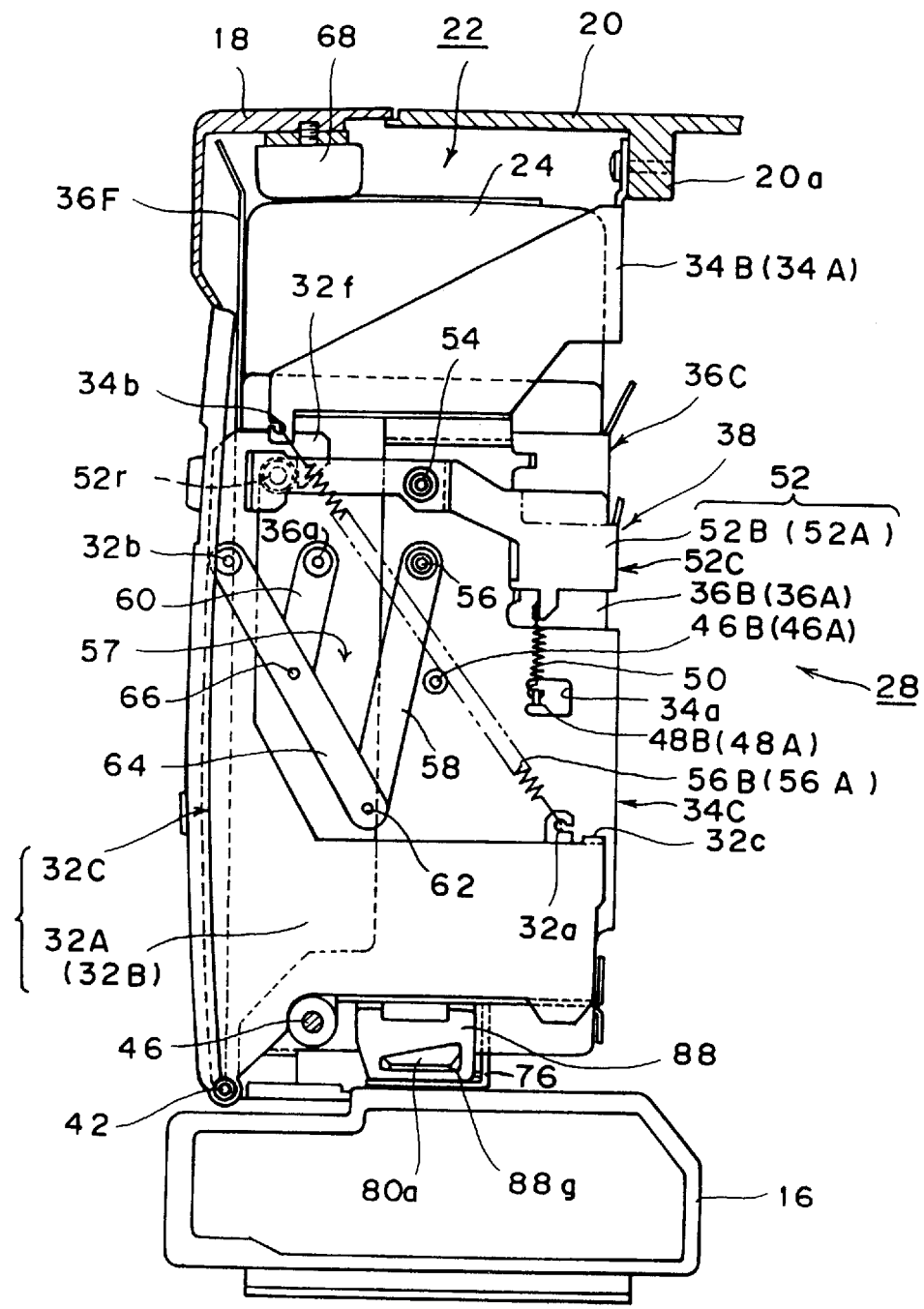
FIG. 1 is a section showing one embodiment of an ejecting device for an image pick up apparatus according to the present invention, illustrated together with a part of an image pick up apparatus, to which the ejecting device is applied.

As shown in FIGS. 1, 2 and 3, the outer contour of the disk pack receptacle portion 10 is formed integrally with a rear surface side of the casing 14, which is the left side portion in FIG. 3, a wall portion of a side surface side opposed to the optical portion 1, a cover member 18 to be selectively situated at an open condition and a closed condition relative to an open end portion of the front surface side of the casing 14, which is the right side portion in FIG. 3, and an upper surface portion 20 of the casing 14 formed in opposition to the upper surface portion of the rear leg portion 16. The cover member 18 is constructed with an extension portion provided at the inner surface side of pushing member 68, discussed later, in opposition to the end portion of the upper surface portion 20 of the casing 14 and a front surface portion extending continuously from the extension portion and in a vertical direction. Accordingly, the front surface side portion of the outer contour of the disk pack receptacle portion 10 is defined by the cover member 18 to permit arrangement of the disk pack 22 at a position closer to the front surface side (open end portion).

In an internal space defined by the disk pack receptacle portion 10, an ejecting device 28 is arranged.

Figure 4:
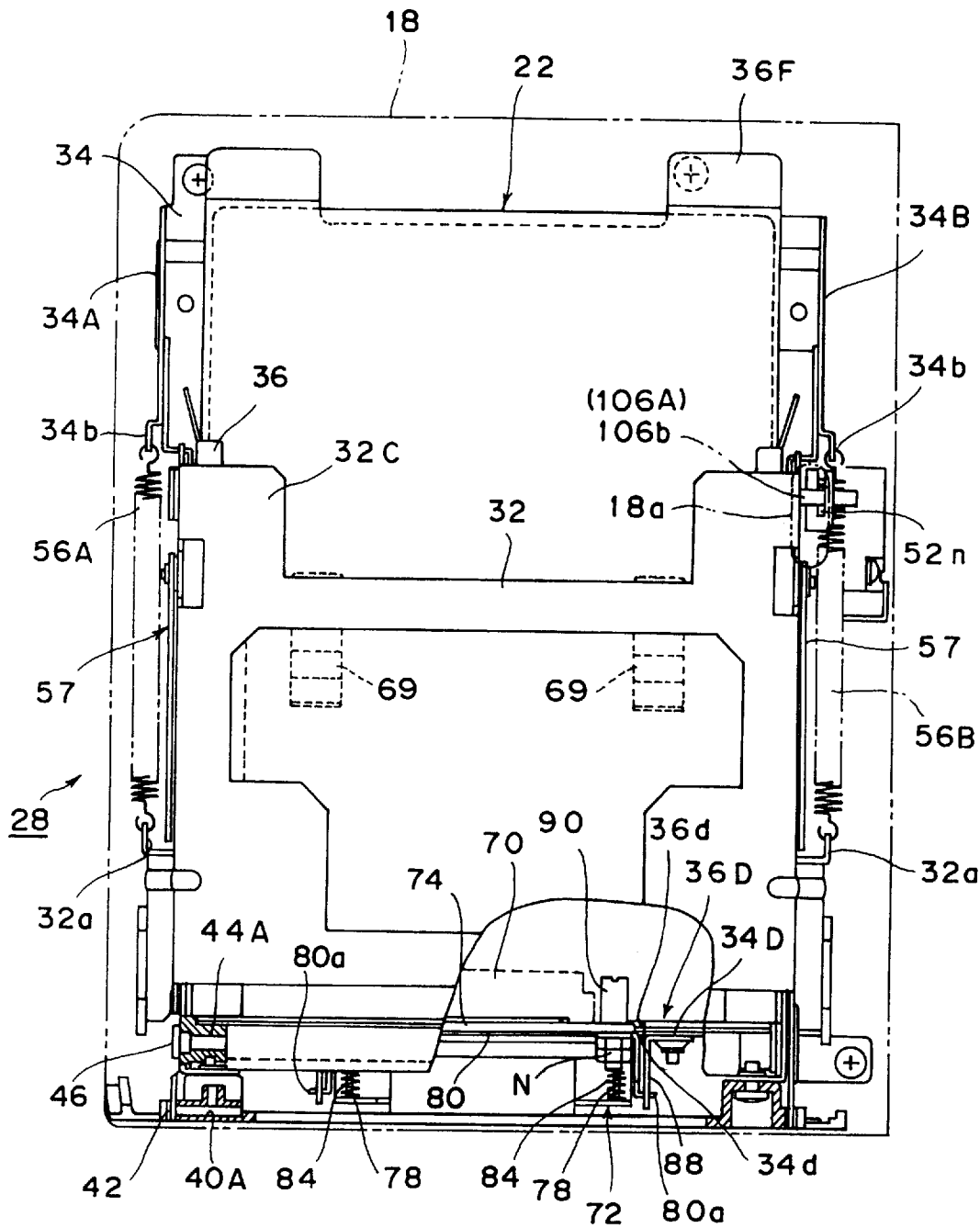
FIG. 4 is a section showing a front elevation of the embodiment shown in FIG. 1.

As shown in FIGS. 1 and 4, the ejecting device 28 includes a frame member 32 having a flat surface portion 32C fixed onto the inner surface portion of the cover member 18 with screws, and side surface portions 32A and 32B extending rearwardly along the longitudinal direction of the casing 14 with bends at from both end portions, a stationary frame member 34 fixed on a support portion 20a extending downwardly from the upper surface portion 20 at the upper end portion with screws, fixed on the upper surface portion of the rear leg portion 16 at the lower end portion arranged in opposition to the cover member 18, a movable holding member 36 held on the outer peripheral portion of the protective casing 24 of the disk pack 22 inside of the stationary frame member 34, and a pair of link mechanisms 57 coupling the stationary frame member 34, the frame member 32 and the movable holding member 36.

In the ejecting device 28, a connection control mechanism portion 72 controlling a connecting operation or a disconnecting operation of the female connector 70 to be connected to the connector 26, depending upon the opening and closing operation of the cover member 18, and a locking/unlocking mechanism portion 38 selectively held on the cover member 18 and the frame member 32, as shown in FIG. 1 in the closed condition relative to the open end portion of the front surface side of the casing 14, are provided.

The stationary frame member 34 has a flat surface portion 34C opposed to a portion at the rear surface side of the casing 14 with each side surface portions 34A and 34B bent frontwardly from both end portions of the flat surface portion 34C, arranged in opposition to each other.

As shown in FIGS. 1 and 4, on the frontward portion of the lower end portions of the side surface portions 34A and 34B, a pair of supporting holes 40A and 40B are provided. In FIG. 4, only supporting hole 40A is shown, while the supporting hole 40B is not illustrated. In the supporting holes 40A and 40B, support shafts 42 are inserted via holes at the lower end of the frame member 32. The first supporting portion is defined by the support shaft 42 and the supporting holes 40A and 40B. Thus, the frame member 32 and the cover member 18 are pivotably supported on the stationary frame member 34.

A pair of supporting holes 44A and 44B are provided at locations proximate to the rear side and to the upper side relative to the supporting holes 40A and 40B in the lower portions of the side surface portions 34A and 34B. In FIG. 4, only supporting hole 44A is shown, while the supporting hole 44B is not illustrated. In each of the supporting holes 44A and 44B, support shafts 46 are inserted via holes in the movable holding member 36, which will be discussed later. By this, the movable holding member 36 can be pivotably supported on the stationary frame 34.

On the intermediate portions of the side surface portions 34A and 34B, the frame member 32, stopper members 46A and 46B for restricting movement of the frame member 32 and the cover member 18 are provided. In each of the side surface portions 34A and 34B, opening portions 34a are provided at the rear side portion of the stopper members 46A and 46B. On the peripheral edge portions of the opening portions 34a, engaging pieces 48B and 48A engaged to one end of a coil spring 50 are provided. The other end of the coil spring 50 is engaged with an end of the locking arm 52 in the lock/unlock mechanism 38 which will be discussed later. In the side surface portions 34A and 34B, at positions above the portion where the stopper members 46A and 46B are provided, support shafts 54, pivotably supporting the locking arm member 52, are provided, respectively. At a position obliquely upward of the portion where the support shaft 54 is provided, engaging portions 34b, to which respective ends of coil springs 56A and 56B are provided. The other respective ends of the coil springs 56A and 56B are engaged with engaging portions 32a provided at the rear end of the side surface portions 32A and 32B of the frame member 32.

On the inner side surface portion of the upper end portion of the cover member 18, a pushing member 68 contacting with the upper surface portion of the protective casing 24 for restricting vertical motion of the protective casing 24 is provided. The pushing member 68 is made of a resin, for example, and has a spring (not shown) downwardly biasing the outer peripheral portion therein. Between the engaging portions 32a at the rear ends of the side surface portions 32A and 32B of the frame member 32 and the engaging portions 34b of the side surface portions 34A and 34B of the stationary frame member 34, the coil springs 56A and 56B act as opening and closing driving mechanisms for biasing the engaging portions 32a and 34b toward each other.

Between the rear end portions of the side surface portions 32A and 32B of the frame member 32 and the side surface portions 34A and 34B of the stationary frame portion 34, a damper unit (not shown) for controlling the opening speed of the cover member 18 is provided. With this construction, when the cover member 18 is urged into the open position by the biasing forces of the coil springs 56A and 56B, the cover member 18 may be opened without causing any shock.

As shown in FIGS. 1 and 4, the movable holding member 36 includes a rear surface portion 36C arranged in opposition to the flat surface portion 34C of the stationary frame member 34, a front surface portion 36F arranged in opposition to the flat surface portion 32C of the frame member 32, side surface portions 36A and 36B respectively arranged in opposition to the side surface portions 32A and 32B of the frame member 32, and a bottom surface portion 36D arranged in opposition to an opening portion 34d provided in a bottom surface portion 34D connecting the side surface portions 34A and 34B of the stationary frame member 34. On the bottom surface portion 36D, an opening portion 36d is provided at a position opposed to the connector 26 of the protective casing 24 of the disk pack 22 to be received.

At substantially central portions of the internal peripheries of the front surface portion 36F, the side surface portions 36A and 36B, the rear surface portion 36C and the bottom surface portion 36D, leaf springs 69 for contacting with the outer peripheral surfaces of the protective casing 24 of the disk pack 22, thus for holding the protective casing 24, are provided. The connector 26 provided in the protective casing 24 of the disk pack 22 is positioned at a position opposed to the opening portion 36d in the movable holding member 36. The vertical position of the protective casing 24 is also restricted by the leaf spring 69 provided on the inner periphery of the bottom surface portion 36D and the pushing member 68.

A pair of the link mechanisms 57, constructed as a three axle link, are provided for each of the side surfaces 32A and 32B of the frame member 32. Both link mechanisms 57 have the identical construction. Therefore, the construction of only one of the link mechanism 57 will be discussed. The link mechanism 57 includes a plate form member 58 pivotably supported on the support shaft 56 provided between the support shaft 54 and the stopper member 46B in the stationary frame 34 at one end, a plate form member 64 pivotably coupled with the other end of the plate form member 58 via a connecting pin 62 at the other end and connected to the support shaft 32b provided on the side surface portion 32A of the frame member 32 at one end, and a plate form member 60 pivotably connected to the support shaft 36a of the movable holding member 36 at one end and pivotably connected to the central portion of the plate member 64 via a connecting pin 66 at the other end.

Figure 9:
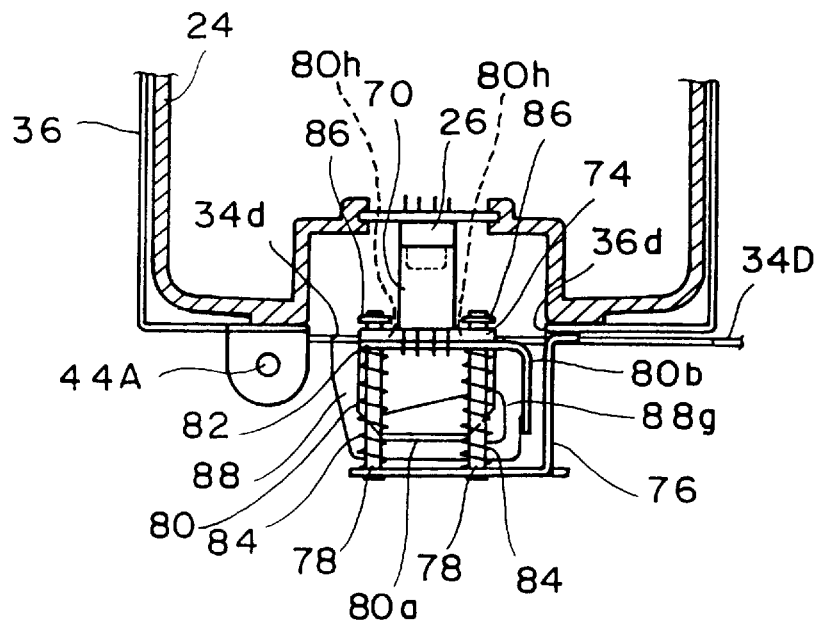
FIG. 9 is an illustration for explanation of an operation of a connection control mechanism portion of the embodiment of FIG. 1.

As shown in FIGS. 1, 4 and 9, the connection control mechanism portion 72 includes a base plate 74, on which the female connector 70 is fixed, a plate form member 76 having an opening portion through which a cable of the connector 70 fixed on the surface opposing to the rear leg portion 16 in the movable holding member 36 passes, four guide pins 78 provided on the plate member 76 substantially perpendicular to the surface and substantially parallel to the bottom surface portion 36D of the movable holding member 36, a base plate holding member 80 having four through holes 80h to be guided by the guide pins 78 and holding the base plate 74, stopper rings 86 provided at tip end portions of respective guide pins 78 for restricting movement of the base plate holding member 80, and a pair of restricting members 88 having guide grooves 88g to be engaged with engaging pieces 80a of the base plate holding member 80 and to be fixed on the lower surface portion in the bottom surface portion 34D of the stationary frame member 34, clamping both side edge portions of the base plate holding member 80.

On the base plate 74 and the base plate holding member 80, a pair of female type engaging pins 90 for positioning are fixed with nuts N at both sides of the connector 70 corresponding to the pins 22c of the protective casing 24 of the disk pack 22.

The supporting member is formed with the guide pins 78 and the plate form member 76.

The base plate holding member 80 has the engaging pieces 80a respectively opposed to the restricting member 88 and engaged with the guide groove 88g of the restricting member 88 and restricting pieces 80b selectively contacted with the plate member 76 for restricting downward movement of the latter.

Figure 5:
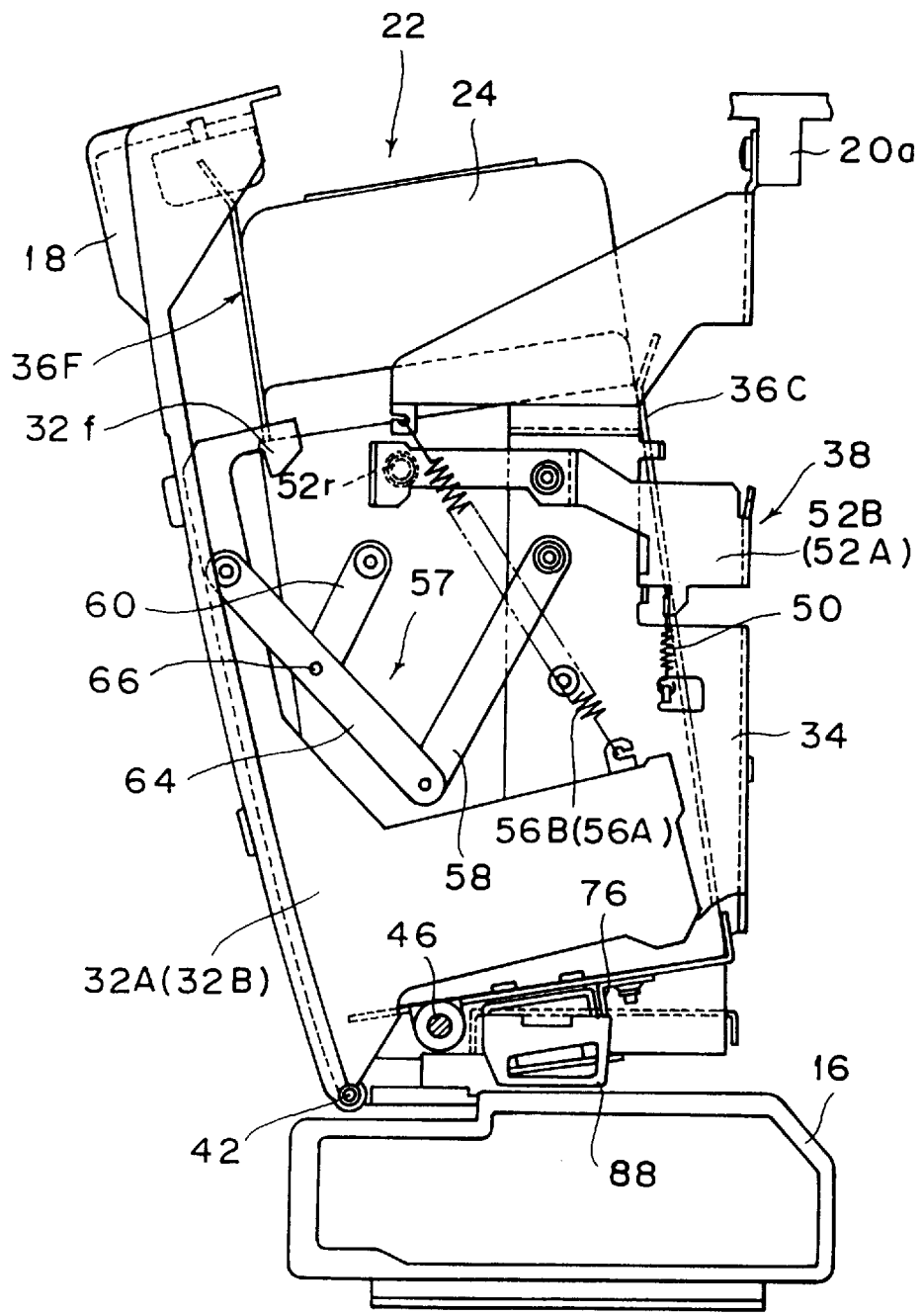
FIG. 5 is an illustration for explanation of an operation of the embodiment of FIG. 1.
Figure 10:
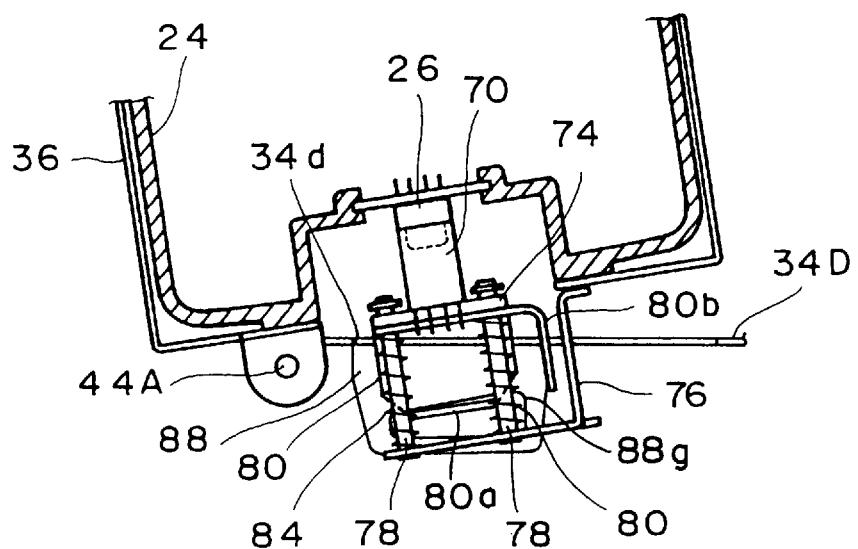
FIG. 10 is an illustration for explanation of an operation of a connection control mechanism portion of the embodiment of FIG. 1.

With the construction set forth above, when the disk pack 22 is received within the movable holding member 36 and the connectors 26 and 70 are connected, and when the movable holding member 36 is tilted from a receiving position (a substantially vertical condition, as shown in FIG. 1) to the frontwardly tilted condition, in which the cover member 18 is opened and the cover member 18 and the movable holding members 36 are tilted frontwardly by the biasing forces of the coil springs 56A and 56B, as shown in FIG. 5, the engaging pieces 80a of the base plate holding member 80 engage with the inner peripheral surface having a given gradient in the guide grooves 88g of the restricting members 88, as shown in FIG. 10.

Figure 11:
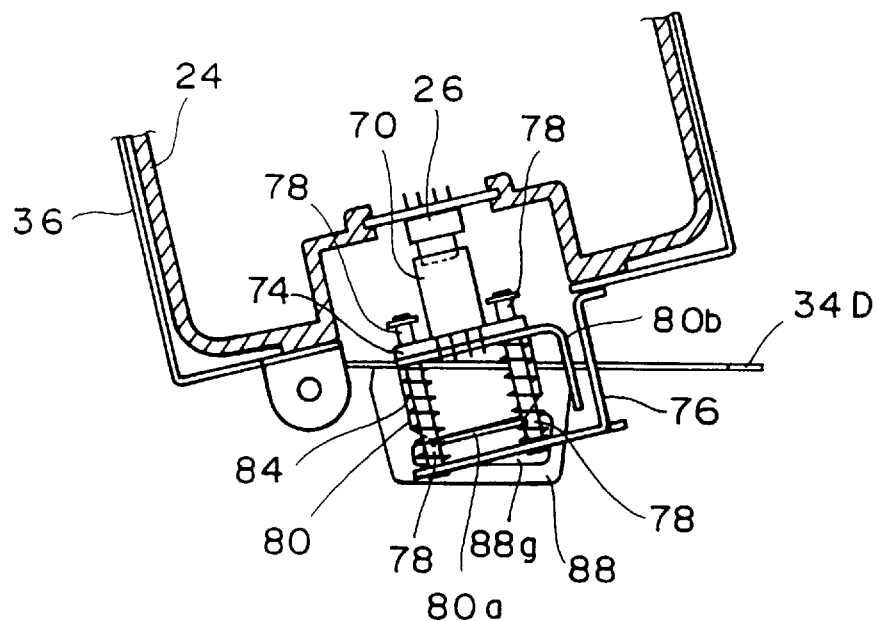
FIG. 11 is an illustration for explanation of an operation of a connection control mechanism portion of the embodiment of FIG. 1.

Next, the cover member 18 and the movable holding member 36 are further tilted frontwardly by the biasing forces of the coil springs 56A and 56B. Then, as shown in FIG. 11, when the engaging pieces 80a of the base plate holding member 80 are engaged with the guide grooves 88g of the restricting member 88, when the base plate 74 and the connector 70 are restricted at the predetermined position, the plate member 76 is lifted upwardly due to the pivoting motion of the movable holding member 36 to cause the connector 26 to shift away from the connector 70. When the base plate holding member 80 is restricted from movement in an upward direction by the restricting member 88, the connector 26 is caused to shift away from the connector 70 by pivoting the movable holding member 36.

Figure 12:
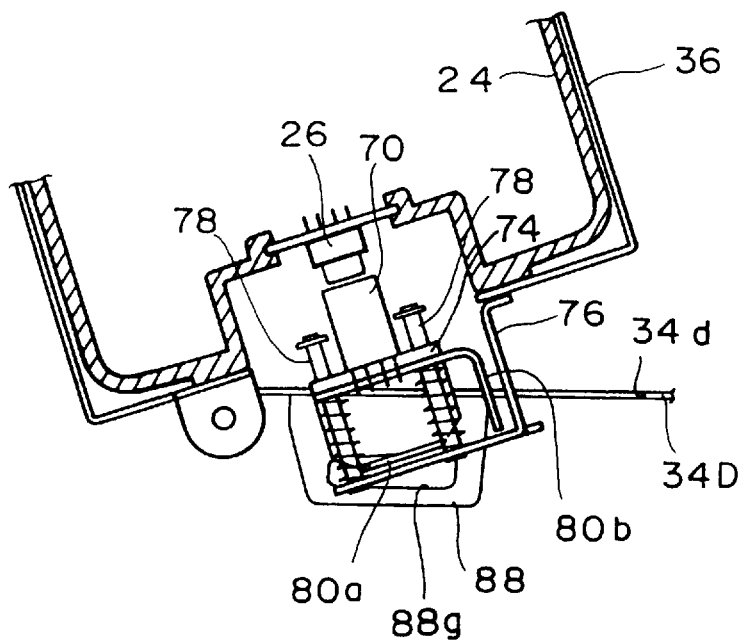
FIG. 12 is an illustration for explanation of an operation of a connection control mechanism portion of the embodiment of FIG. 1.

When the cover member 18 and the movable holding member 36 are further tilted frontwardly by the biasing force of the coil springs 56A and 56B, respective contact portions 32*c* in the side surface portions 32A and 32B of the frame member 32 come into contact with the stopper members 46A and 46B to restrict pivoting movement of the cover member 18 and the movable holding member 36 for positioning the cover member 18 and the movable holding member 36 at an eject position. At this time, the open angles of the cover member 18 and the movable holding member 36 are greatest. The opening angle of the movable holding member 36 relative to the opening end portion of the casing 14 is set by the link mechanism 57 at a predetermined angle, which is smaller than the opening angle of the cover member 18 and at which ejection of the disk pack 22 is facilitated and the tilting angle is small. After disconnection of the connector 26 from the connector 70, the restricting pieces 80*b* of the base plate holding member 80 contact with the plate member 76, as shown in FIG. 12. Accordingly, even when the weight of the disk pack 22 is greater than the weight of the video tape, the possibility of dropping the image pick up apparatus can be eliminated since the ejection of the disk pack 22 can be performed at a relatively small tiling angle relative to the open angle.

Figure 13:
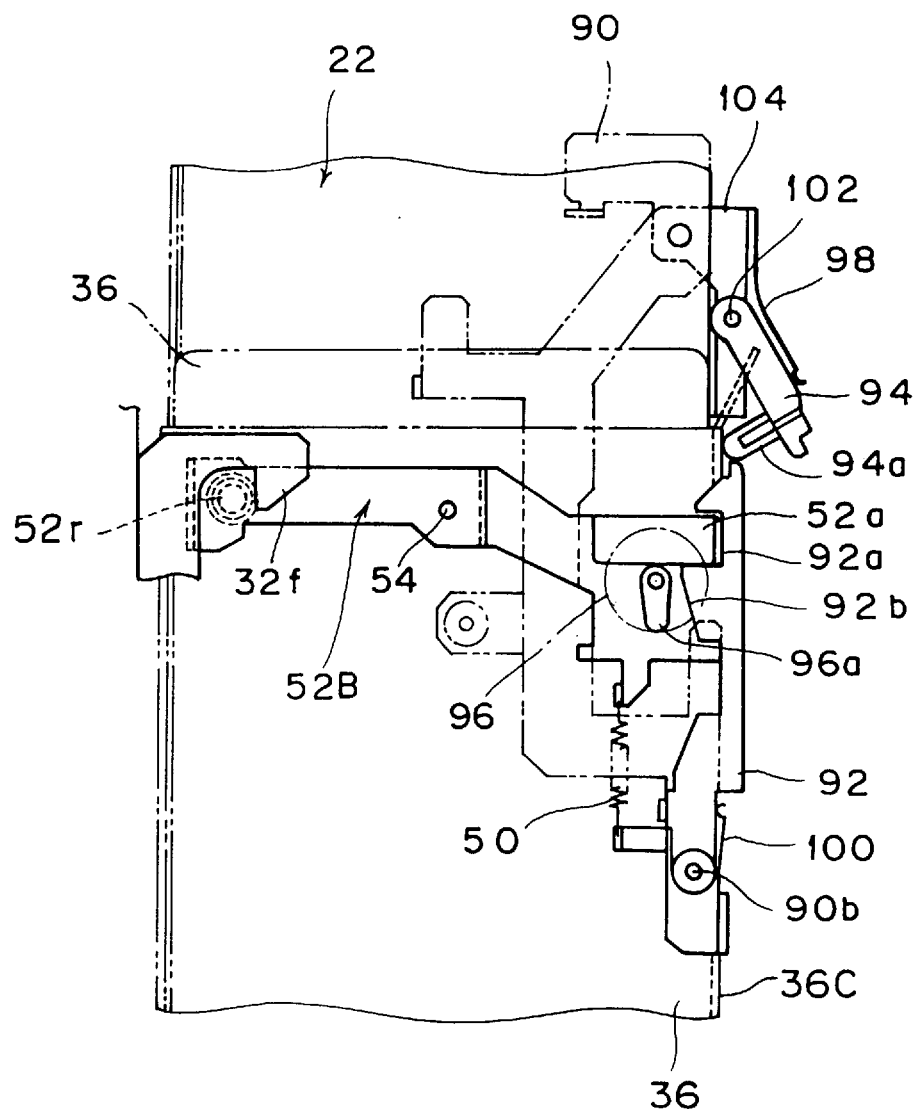
FIG. 13 is an illustration for explanation of an operation of a locking/unlocking mechanism portion of the embodiment of FIG. 1.

As shown in FIGS. 1 and 13, the locking/unlocking mechanism portion 38 is constructed with a locking arm member 52 pivotably supported on support shafts 54 provided on the side surface portions 34A and 34B of the stationary frame member 34 and is selectively engageable with hook portions 32*f* of the side surface portions 32A and 32B in the frame member 32, a safety hook member 92 pivotably supported on a support shaft 90*b* of a support member 90 fixed to the side surface portion 34B of the stationary frame member 34 and is selectively engageable with an engaging piece 52*a* of the locking arm member 52 for preventing the cover member 18 from being pivoted to the open condition, a release arm member 94 pivotably supported on a support shaft 102 of a connecting member 104 fixed to the support member 90 and contacting with the rear surface portion 36C of the movable holding member 36, an unlocking mechanism 96 supported on the stationary frame member 34 and having a cam portion 96 for selectively pushing the engaging piece 52*a* of the locking arm member 52 and the safety hook member 92, and a coil spring 50 for biasing the locking arm 52 in a clockwise direction about the support shaft 54.

The locking arm member 52 has a roller 52*r* provided at the tip end for selectively engaging with the hook portions 32*f* of the side surface portions 32A and 32 at the tip end, side surface portions 52A and 52B formed with through openings to engage with the support shaft 54 and a connecting portion 52C connecting the side surface portions 52A and 52B arranged in opposition to the rear surface portion 36C of the movable holding member 36. At the rear end portion in the outer surface portion of the side surface portion 52B, the engaging piece 52 for engaging with the safety hook member 92, which will be discussed later, is fixed.

As shown in FIG. 13, the safety hook member 92 is formed into a plate form member and is pivotably supported on a support shaft 90*b* of the supporting member 90 at the lower end thereof. At the upper portion of the safety hook member 92, an engaging groove 92*a* to engage with the engaging piece 52*a* of the locking arm member 52 and a tilted surface portion 92*b* to be pushed by the cam member 96*a* of the unlocking mechanism portion 90, which will be discussed later, are provided. On one end surface of the lower portion of the safety hook member 92, a leaf spring 100, which is fixed to the supporting member 90 for biasing the safety hook member 92 in a direction for engagement, is contacted at the other end thereof.

In FIG. 13, the release arm member 94 is supported by a connecting portion 104 at a position shifted a given distance in a direction perpendicular to the plane of the drawing in relation to the position where the safety hook member 92 is provided in the support member 90. On one end surface of the release arm member 94, a leaf spring 98, one end of which is fixed to the connecting member 104, is contacted at the other end for biasing the contacting portion 94*a* of the release arm member 94 in a direction for contacting with the rear surface portion 36C of the movable holding member 36.

The unlocking mechanism 96 is constructed with a driving motor (not shown), a speed reduction mechanism portion connected to an output shaft of the driving motor, and the cam member 96*a* connected to an output side of the speed reduction mechanism portion pushing the engaging piece 52*a* and the tilted surface portion 92*b* of the safety hook member 92. When the driving motor is actuated, the cam member 96*a* is driven in a counterclockwise direction, in the direction for pushing the tilting surface portion 92*b* of the engaging piece 52*a* and the safety hook member 92, to rotate one cycle to place the engaging piece 52*a* of the locking arm member 52 and the engaging groove 92*a* of the safety hook member 92 in a disengaged position.

The driving motor is controlled on the basis of a driving control signal from a driver circuit portion (not shown). For example, when an eject operation switch 106, provided on the casing 14, is operated, for example, when termination of recording or reproducing operation of the disk pack 22 is detected, the drive control signal is supplied to the driving motor. When a terminated condition of recording or reproducing operation of the disk pack 22 is not detected, the drive control signal is not supplied to the driving motor. By this, the possibility of the occurrence of ejection of the disk pack 22 during a recording or reproducing operation of the disk pack 22 can be successfully eliminated.

Figure 14:
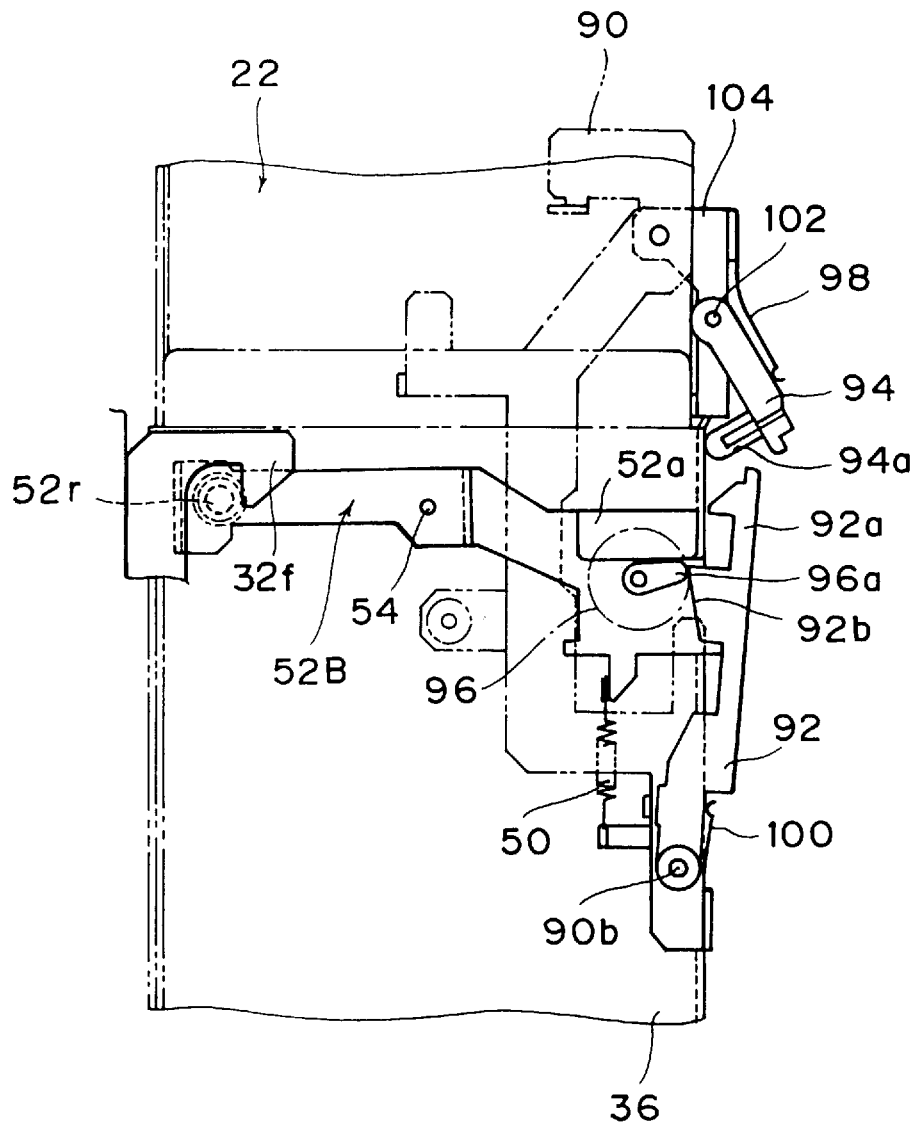
FIG. 14 is an illustration for explanation of an operation of a locking/unlocking mechanism portion of the embodiment of FIG. 1.
Figure 15:
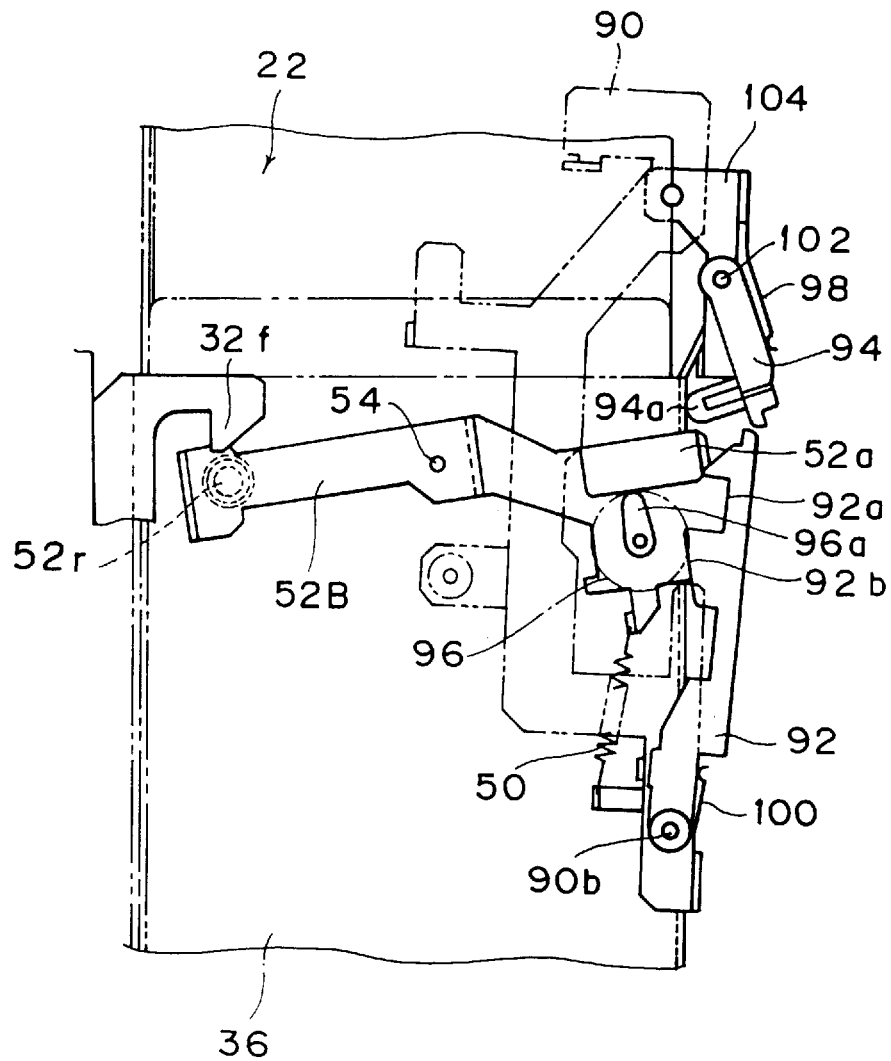
FIG. 15 is an illustration for explanation of an operation of a locking/unlocking mechanism portion of the embodiment of FIG. 1.

In the construction set forth above, when the disk pack 22 is to be ejected from the disk pack receptacle portion 10, as shown in FIGS. 1 and 13, when the eject operation switch 106 is operated while the roller 52*r* of the locking arm member 52 is in engagement with the hook portion 32*f* of the frame member 32, the driving motor is actuated after a given short period to cause rotation of the cam member 96*a* of the unlocking mechanism portion 96 in a counterclockwise direction. By this, as shown in FIG. 14, the safety hook member 92 is pivoted against the biasing force of the leaf spring 100 to initiate releasing of the engaging groove 92*a* of the safety hook member 92 from engagement with the engaging piece 52*a* of the locking arm member 52.

Figure 6:
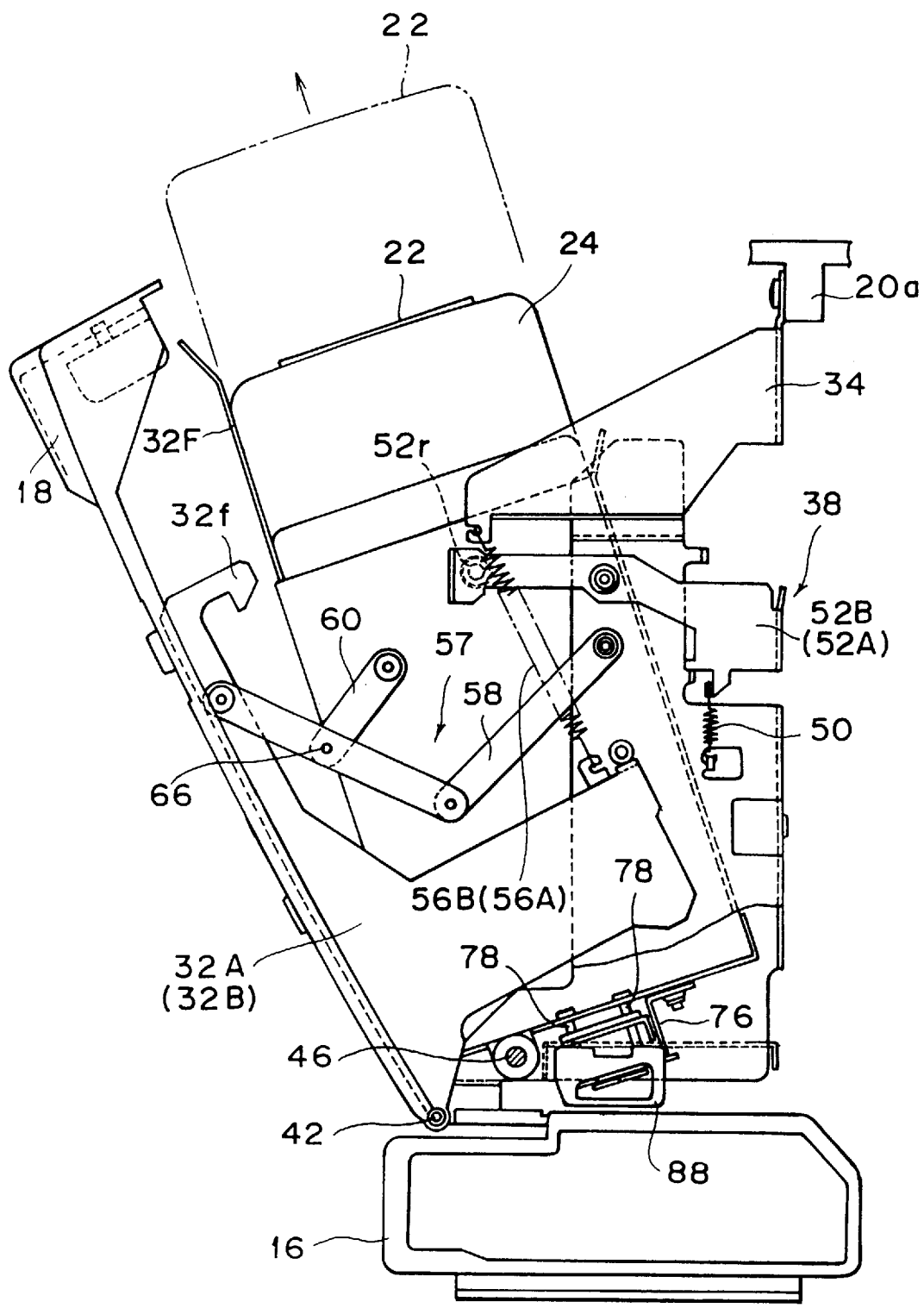
FIG. 6 is an illustration for explanation of operation of the embodiment of FIG. 1.

Next, by further rotating the cam member 96*a* of the unlocking mechanism portion 96, the engaging groove 92*a* of the safety hook member 92 is disengaged from the engaging piece 52*a* of the locking arm member 52, and, in conjunction therewith, the engaging piece 52*a* is pushed upwardly against the biasing force of the coil spring 50 by the cam member 96*a* to disengage the roller 52*r* of the locking arm member 52 from the hooking portion 32*f* of the frame member 32. By this, the movable holding member 36 and the disk pack 22 are tilted frontwardly by the biasing force of the coil springs 56A and 56B, as shown in FIGS. 5, 6 and 16.

Figure 16:
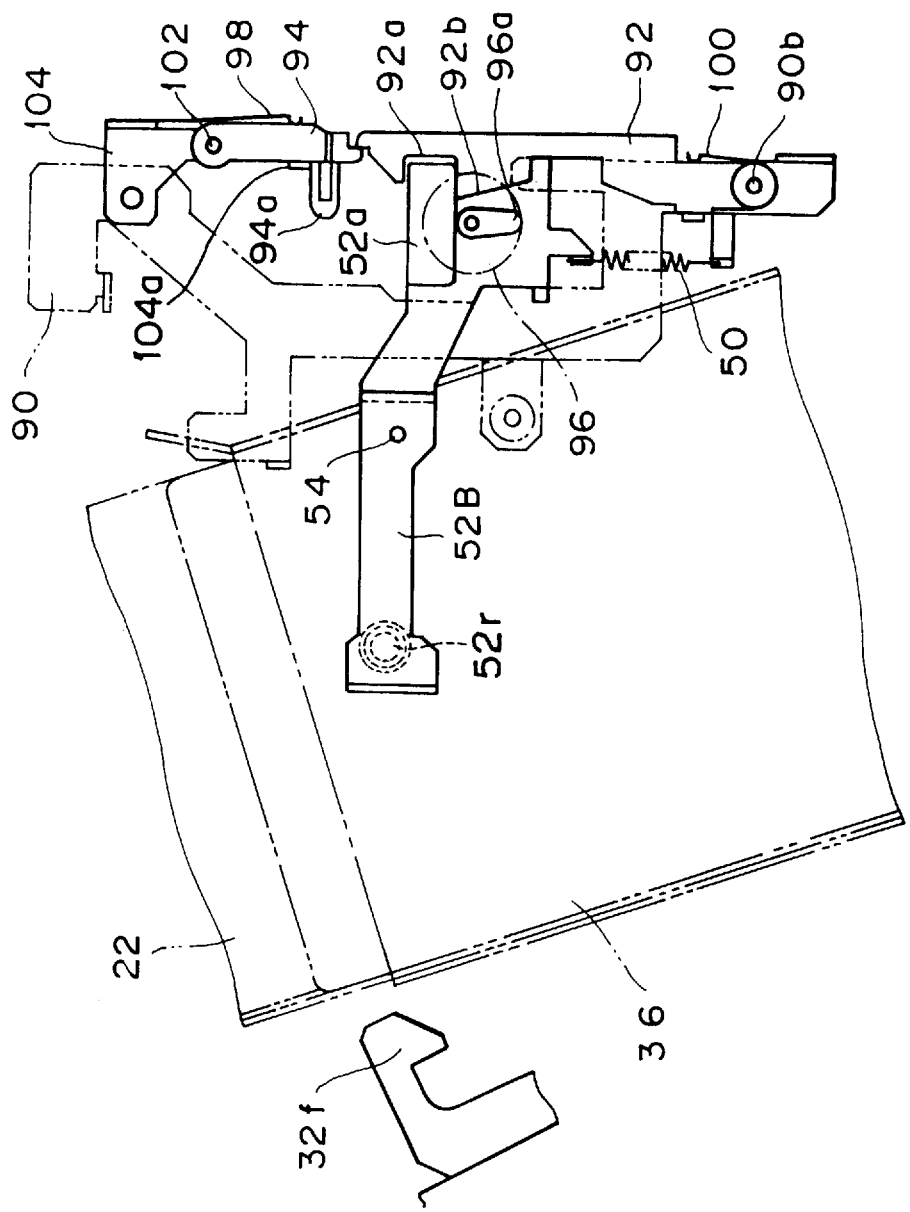
FIG. 16 is an illustration for explanation of an operation of a locking/unlocking mechanism portion of the embodiment of FIG. 1.

Subsequently, as shown in FIG. 16, the cam member 96*a* of the unlocking mechanism portion 96 is further rotated to return to the initial position. At this time, the locking arm member 52 is pivoted in a clockwise direction by the biasing force of the coil spring 50. In conjunction therewith, the safety hook member 92 is pivoted toward the side of the movable holding member 36 by the biasing force of the leaf spring 100 to cause engagement of the engaging piece 52*a* with the engaging groove 92*a* of the safety hook member 92. The release arm member 94 is pivoted toward the movable holding member 36 by the biasing force of the leaf spring 98. By this, the tip end of the release arm member 94 engages with the tip end of the safety hook member 92, and in conjunction therewith, engages with the engaging portion 104*a* of the connecting member 104.

Figure 17:
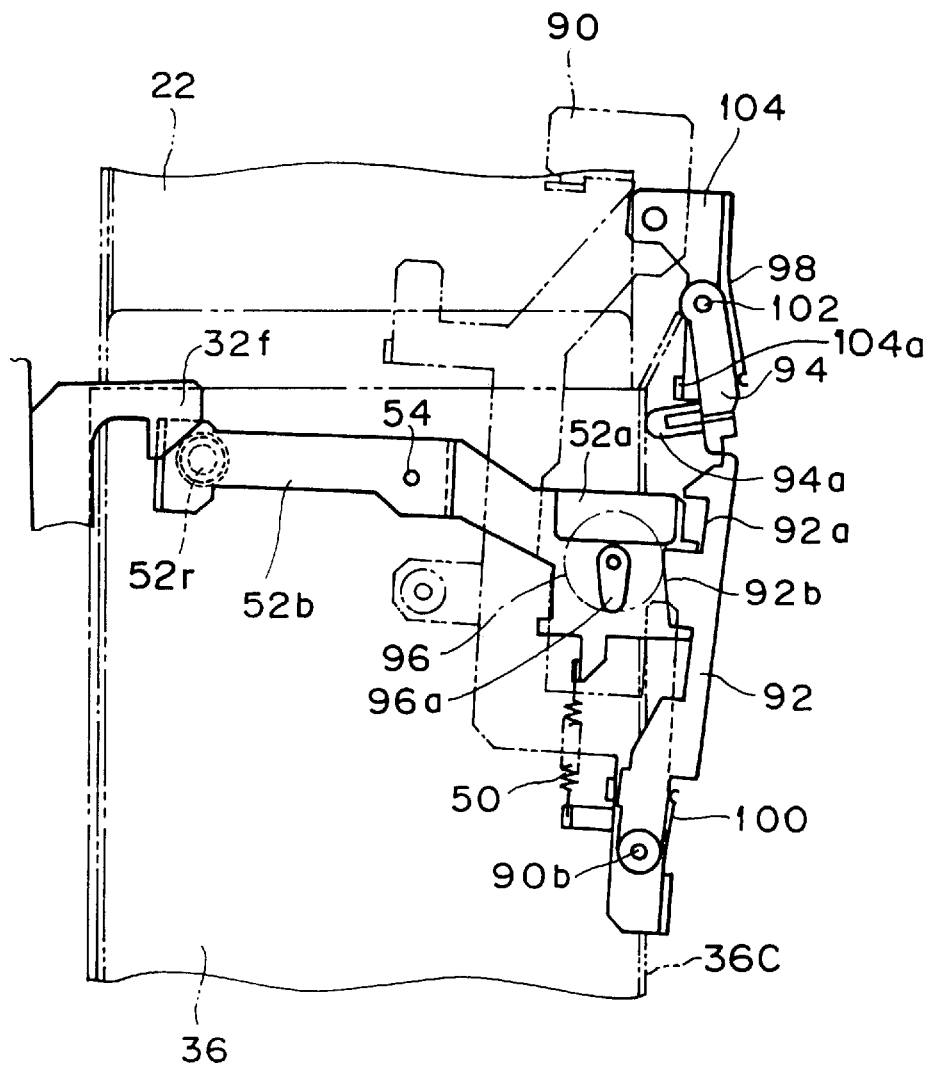
FIG. 17 is an illustration for explanation of an operation of a locking/unlocking mechanism portion of the embodiment of FIG. 1.

For receiving the disk pack 22 within the disk pack receptacle portion 10, after setting of the disk pack 22 within the movable holding member 36, the cover member 18 and the frame member 32 are pushed backwardly. Then, as shown in FIG. 17, the contact portion 94*a* of the release arm member 94 is pushed backwardly against the biasing force of the leaf spring 98 by the rear surface portion 36C of the movable holding member 36.

By this, the safety hook member 92 is pivoted rearwardly by the tip end of the release arm member 94. Then, the engaging groove 92*a* is placed in disengaged condition relative to the engaging piece 52*a* of the locking arm member 52, and the tip end of the hook portion 32*f* of the frame member 32 is contacted with the roller 52*r* of the locking arm member 52. Subsequently, the roller 52*r* of the locking arm member 52 is placed into the engaging condition relative to the hook portion 32*f* of the frame member 32. Then, the engaging groove 92*a* of the safety hook member 92 is again engaged with the engaging piece 52*a* of the locking arm member 52.

Figure 18:
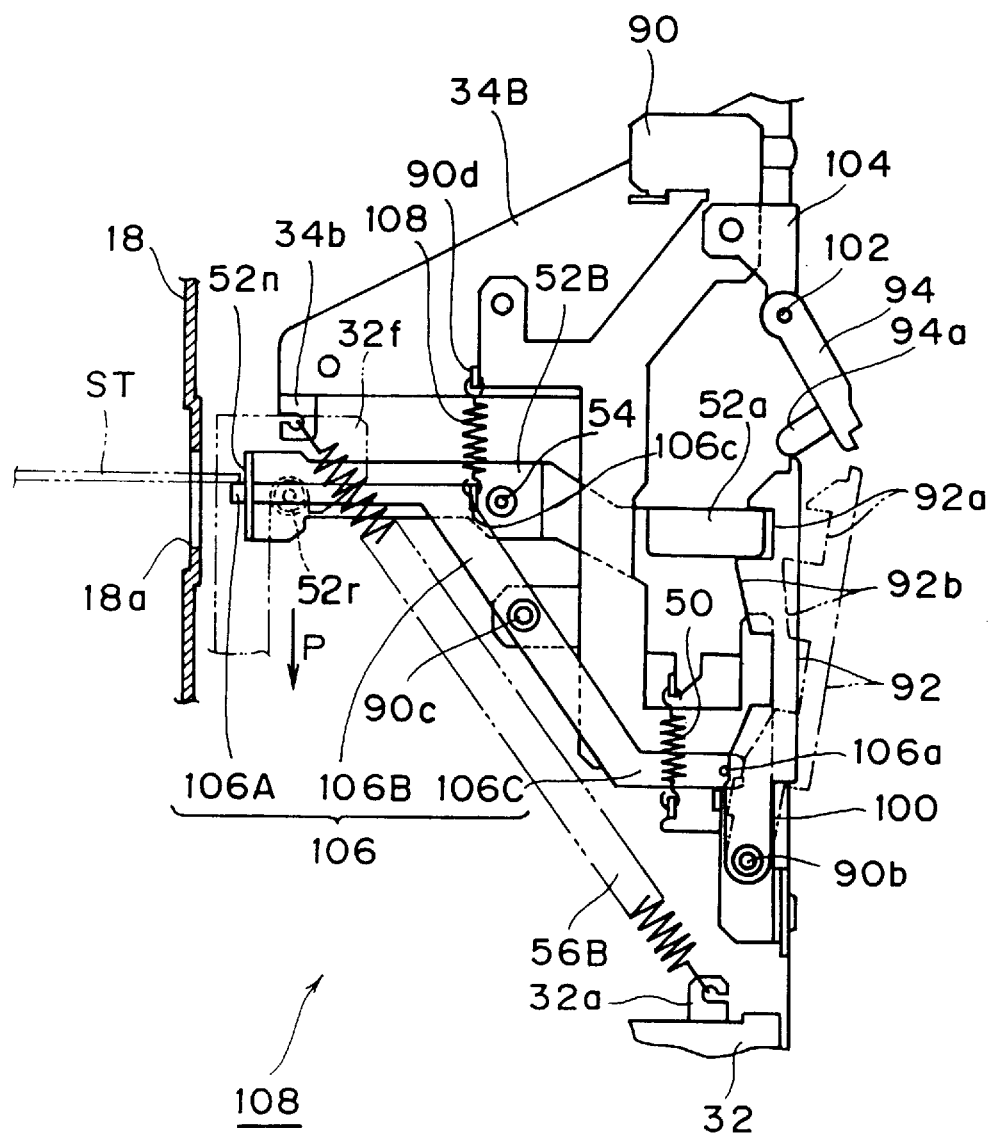
FIG. 18 is an illustration for explanation of an operation of a locking/unlocking mechanism portion of the embodiment of FIG. 1.

As shown in FIG. 18, in the ejecting device 28, in addition, a manual unlocking mechanism portion 108 forcedly places the locking/unlocking mechanism portion 38 into an unlocked condition if the locking/unlocking mechanism portion 38 is in the locked condition due to malfunctioning of the driving motor of the unlocking mechanism portion 96.

The manual unlocking mechanism portion 108 is constructed with an unlocking arm member 106 adapted to push the safety hook member 92 so that the engaging groove 92*a* is at an unlocked condition relative to the engaging piece 52*a* of the locking arm member 52, pivotably supported on support shaft 90C of supporting member 90, and a return spring 108 engaged with an engaging portion 90*d* of the support member 90 at one end and engaged with the upper portion of the unlocking arm member 106 at the other end.

As shown in FIGS. 4 and 18, the unlocking arm member 106 includes an engaging portion 106A engaged with a cut-out portion 52*n* provided at the tip end of the locking arm member 52, a pushing portion 106C having a connecting pin 106*a* engaging with the safety hook member 92 for pushing the safety hook member 92, and a connecting portion 106B mutually connecting the engaging portion 106A pivotably supported on the support shaft 90*c* of the supporting member 90 and the pushing portion 106C.

At the tip end portion of the engaging portion 106A, a bent portion 106*b*, to which a tip end portion of a bar shaped member ST inserted through an opening portion 18*a* provided in the cover member 18 is engaged, is provided. In the connecting portion 106B, an engaging portion 106C, adapted to engage with the other end of the return spring, 108 is provided. The engaging portion 106A and the pushing portion 106C are connected by the connecting portion 106B in a substantially parallel relationship to each other.

Upon forcedly placing the locking/unlocking mechanism portion 38 at the unlocked condition with the manual unlocking mechanism portion 106B, the tip end of the member ST is pushed in the direction of arrow P shown in FIG. 18 under the 10 condition where the member ST is engaged with the bent portion 106*b* of the engaging portion 106A.

By this, the unlocking arm member 106 is pivoted. Then, the pushing portion 106C pushes the safety hook member 92 via the connecting pin 106*a* against the biasing force of the leaf spring 100. Then, the engaging groove 92*a* of the safety hook member 92 is placed into a disengaged condition relative to the engaging piece 52*a* of the locking arm member 52, as shown in dashed line in FIG. 18.

Next, when the tip end of the member ST is further pushed in the direction shown by the arrow P in FIG. 18, the roller 52*r* of the locking arm member 52 is pivoted downwardly about the support shaft 54. By this, in the locking/unlocking mechanism portion 38, 25 the roller 52*r* of the locking arm member 52 is placed into unlocking condition relative to the hooking portion 32*f* of the frame member 32.

Although the invention has been illustrated and described with respect to exemplary embodiments thereof, it should be understood by those skilled in the art that various changes, omissions and additions may be made thereto without departing from the spirit and scope of the present invention.

What is claimed is:

1. An ejecting device of an image pick up apparatus comprising:

a portable recording medium unit arranged within a recording medium receptacle portion in said image pick up apparatus and having a recording medium and a first input/output terminal performing inputting and outputting image pick up data relative to said recording medium;

a cover member pivotably supported to a first support portion in a stationary member provided within said recording medium receptacle portion, selectively positionable in open and closed positions relative to an opening portion of said recording medium receptacle portion;

a movable holding member having an opening portion at a position opposed to said first input/output terminal in said portable recording medium unit, connected to and pivotably supported on a second support portion inwardly positioned relative to said first support portion of said stationary member, to hold said portable recording medium unit for operating and to shift said portable recording medium unit between an eject position and a stored position;

a connection control mechanism portion having a second input/output terminal which is rotated together with said movable holding member at a rotational angle smaller than a predetermined rotational angle of said movable holding member, and is connected to said first input/output terminal via an opening portion of said movable holding member for performing inputting and outputting the image pick up data, and is connected to said movable holding member, said connection control mechanism portion being provided for connecting and disconnecting of said second input/output terminal relative to said first input/output terminal depending upon operation of said movable holding member;

a link member connecting said cover member and said movable holding member; and means for placing said cover member between open and closed positions.

2. An ejecting device for an image pick up apparatus as claimed in claim 1, which further comprises a pushing member provided on said cover member and has a pushing surface portion contacting with the end surface of said portable recording medium unit when said portable recording medium unit is held and placed at the stored position by said movable holding member, for pushing said first input/output terminal relative to said second input/output terminal.

3. An ejecting device for an image pick up apparatus as claimed in claim 1, wherein said connection control mechanism portion includes:

a supporting member arranged in said movable holding member and movably supporting a plate member having said second input/output portion arranged in opposition to said first input/output terminal;

an elastic member placing said plate member at relative to said first input/output portion depending upon pivotal movement of said movable holding member; and a restricting member for placing said plate member away from said first input/output terminal depending upon pivotal movement of said movable holding member arranged at said stationary member provided within said recording medium receptacle portion.

4. An ejecting device for an image pick up apparatus as claimed in claim 1, wherein said cover member has an extension portion covering the upper portion in said recording medium receptacle portion.

5. An ejecting device for an image pick up apparatus as claimed in claim 1, which further comprises a locking/unlocking mechanism portion provided in said stationary member in said recording medium receptacle portion for selectively holding said cover member at said closed position relative to said recording medium receptacle portion, and an unlocking mechanism portion for forcedly placing said locking/unlocking mechanism portion at unlocking condition.

6. An ejecting device for an image pick up apparatus as claimed in claim 1, wherein said portable recording medium unit is held by said movable holding member and shifted to said ejecting position, a contact portion connected to said cover member is contacted with a stopper member arranged on said stationary member provided in said recording medium receptacle portion, when said cover member is in said open condition, an open angle of said cover member relative to the opening portion of said recording medium receptacle portion is greater than an open angle of said movable holding member relative to the opening portion of recording medium receptacle portion.

7. An ejecting device for an image pick up apparatus as claimed in claim 1, wherein said link member is three-axle link member.

8. An ejecting device for an image pick up apparatus as claimed in claim 1, wherein said portable recording medium unit is a disk pack.

9. An ejecting device for an image pick up apparatus comprising:

a portable recording medium unit arranged within a recording medium receptacle portion in said image pick up apparatus having a recording medium and a first input/output terminal portion performing inputting and outputting of image pick up data relative to said recording medium;

a cover member pivotably attached to a first support portion in a stationary member provided within said recording medium receptacle portion, selectively positionable in open and closed positions relative to an opening portion of said recording medium receptacle portion;

a movable holding member, having an opening portion at a position opposed to said first input/output terminal portion in said portable recording medium unit, connected to and pivotably supported on a second support portion inwardly positioned relative to said first support portion of said stationary member, to hold said portable recording medium unit for operating and to shift said portable recording medium unit between an eject position and a stored position;

a connection control mechanism portion having a second input/output terminal portion which is connected to said first input/output terminal portion via an opening portion of said movable holding member, connected to said movable holding member and for connecting and disconnecting of said second input/output terminal portion relative to said first input/output terminal portion depending upon operation of said movable holding member;

said connection control mechanism portion including:

a supporting member arranged in said movable holding member and movably supporting a plate member having said second input/output portion arranged in opposition to said first input/output terminal portion;

an elastic member placing said plate member relative to said first input/output terminal portion depending upon pivotal movement of said movable holding member;

a restricting member for placing said plate member away from said first input/output terminal portion depending upon pivotal movement of said movable holding member arranged at said stationary member provided within said recording medium receptacle portion;

a link member connecting said cover member and said movable holding member; and means for placing said cover member between open and closed positions.

10. An ejecting device for an image pick up apparatus comprising:

a portable recording medium unit arranged within a recording medium receptacle portion in said image pick up apparatus and having a recording medium and a first input/output terminal portion performing inputting and outputting image pick up data relative to said recording medium;

a cover member pivotably supported to a first support portion in a stationary member provided within said recording medium receptacle portion, selectively positionable in open and closed positions relative to an opening portion of said recording medium receptacle portion;

a movable holding member, having an opening portion at a position opposed to said first input/output terminal portion in said portable recording medium unit, connected to and pivotably supported on a second support portion inwardly positioned relative to said first support portion of said stationary member, to hold said portable recording medium unit for operating and to shift said portable recording medium unit between an eject position and a stored position;

a connection control mechanism portion having a second input/output terminal portion which is connected to said first input/output terminal portion via an opening portion of said movable holding member, connected to said movable holding member and for connecting and disconnecting of said second input/output terminal portion relative to said first input/output terminal portion depending upon operation of said movable holding member;

a link member connecting said cover member and said movable holding member; and means for placing said cover member between open and closed positions;

wherein said portable recording medium unit is held by said movable holding member and shifted to said ejecting position, a contact portion connected to said cover member is contacted with a stopper member arranged on said stationary member provided in said recording medium receptacle portion, when said cover member is in open condition, an open angle of said cover member relative to the opening portion of said recording medium receptacle portion being greater than an open angle of said movable holding member relative to the opening portion of the recording medium receptacle portion.

* * * * *